(12) United States Patent
Tsutsui

(10) Patent No.: US 11,447,095 B2
(45) Date of Patent: Sep. 20, 2022

(54) ALERT DEVICE

(71) Applicants: Toyota Jidosha Kabushiki Kaisha, Toyota (JP); Kabushikikaisha Tokairika Denki Seisakusho, Aichi (JP)

(72) Inventor: Toshihiro Tsutsui, Kasugai (JP)

(73) Assignees: TOYOTA JIDOSHA KABUSHIKI KAISHA, Toyota (JP); KABUSHIKIKAISHA TOKAIRIKA DENKI SEISAKUSHO, Niwa-gun (JP)

( * ) Notice: Subject to any disclaimer, the term of this patent is extended or adjusted under 35 U.S.C. 154(b) by 459 days.

(21) Appl. No.: 16/721,249

(22) Filed: Dec. 19, 2019

(65) Prior Publication Data
US 2020/0198574 A1    Jun. 25, 2020

(30) Foreign Application Priority Data
Dec. 25, 2018 (JP) .............................. JP2018-241153

(51) Int. Cl.
G06V 20/59 (2022.01)
B60R 22/48 (2006.01)
B60R 22/34 (2006.01)

(52) U.S. Cl.
CPC .............. *B60R 22/48* (2013.01); *B60R 22/34* (2013.01); *G06V 20/597* (2022.01); *B60R 2022/4808* (2013.01)

(58) Field of Classification Search
CPC . B60R 22/48; B60R 2022/4808; B60R 22/34; B60R 2022/485; B60R 2022/4866;
(Continued)

(56) References Cited

U.S. PATENT DOCUMENTS 10,059,228 B1 * 8/2018 Aikin .................. B60N 2/42727
10,699,347 B1 * 6/2020 Slusar ................ G01C 21/3461
(Continued)

FOREIGN PATENT DOCUMENTS

DE  102009011580 A1 * 9/2010 ............. B60R 22/44
EP  1652741 A2 * 5/2006 ............. B60R 22/34
(Continued)

OTHER PUBLICATIONS

Cieler, Method for Warning Driver in Vehicle, Involves Adjusting Parameters for Storing Driver-specific Warning Profile . . . , Sep. 16, 2010, EPO, DE 102009011580 A1, Machine Translation of Description (Year: 2010).*

*Primary Examiner* — Paul N Dickson
*Assistant Examiner* — Matthew D Lee
(74) *Attorney, Agent, or Firm* — Dinsmore & Shohl LLP

(57) ABSTRACT

An alert device alerts a driver sitting on a driver's seat in a vehicle by winding a seat belt on the driver's seat with a retractor. The alert device includes a seat position information acquisition unit configured to acquire seat position information relating to a position of the driver's seat, a height estimation unit configured to calculate art estimated height that is an estimated value of the driver's height based on the seat position information, a winding strength setting unit configured to set a winding strength that is a strength for winding the seat belt with the retractor based on the estimated height, and a retractor control unit configured to operate the retractor to wind the seat belt with the winding strength.

5 Claims, 8 Drawing Sheets

(58) Field of Classification Search
CPC ..... G06V 20/59; G06V 20/597; B60W 50/16; B60N 2002/981
See application file for complete search history.

(56) References Cited

U.S. PATENT DOCUMENTS

| | | | | |
|---|---|---|---|---|
| 10,953,850 | B1* | 3/2021 | Pertsel | G06N 3/08 |
| 2006/0115115 | A1* | 6/2006 | Nagaoka | G06V 20/58 |
| | | | | 382/103 |
| 2006/0126898 | A1* | 6/2006 | Nagaoka | B60K 35/00 |
| | | | | 348/148 |
| 2011/0270493 | A1* | 11/2011 | Tanaka | B60R 22/48 |
| | | | | 701/45 |
| 2013/0226408 | A1* | 8/2013 | Fung | G06V 20/597 |
| | | | | 701/1 |
| 2014/0014759 | A1* | 1/2014 | Hall | B60R 22/34 |
| | | | | 242/390 |
| 2016/0009175 | A1* | 1/2016 | Mcnew | H04N 13/383 |
| | | | | 340/438 |
| 2019/0084513 | A1* | 3/2019 | Yamamoto | B60R 22/46 |
| 2020/0189518 | A1* | 6/2020 | Sawai | A61B 5/0077 |

FOREIGN PATENT DOCUMENTS

| | | | | |
|---|---|---|---|---|
| EP | 1655188 A1 * | 5/2006 | | B60R 22/34 |
| JP | H06071338 U | 10/1994 | | |
| JP | 2008197821 A * | 8/2008 | | |
| JP | 2010006362 A * | 1/2010 | | |
| WO | WO-9630235 A1 * | 10/1996 | | B60R 21/0132 |
| WO | WO-0185495 A2 * | 11/2001 | | B60R 22/44 |

* cited by examiner

*Fig.3*

| WINDING STRENGTH W | | SEAT POSITION P | | | | |
|---|---|---|---|---|---|---|
| | | $P_1$ | $P_2$ | $P_3$ | $P_4$ | $P_5$ |
| ESTIMATED HEIGHT ST | $ST_1$ | $W_{11}$ | $W_{21}$ | $W_{31}$ | $W_{41}$ | $W_{51}$ |
| | $ST_2$ | $W_{12}$ | $W_{22}$ | $W_{32}$ | $W_{42}$ | $W_{52}$ |
| | $ST_3$ | $W_{13}$ | $W_{23}$ | $W_{33}$ | $W_{43}$ | $W_{53}$ |
| | $ST_4$ | $W_{14}$ | $W_{24}$ | $W_{34}$ | $W_{44}$ | $W_{54}$ |
| | $ST_5$ | $W_{15}$ | $W_{25}$ | $W_{35}$ | $W_{45}$ | $W_{55}$ |

*Fig.7*

| ESTIMATED HEIGHT ST | $ST_1$ | $ST_2$ | $ST_3$ | $ST_4$ | $ST_5$ |
|---|---|---|---|---|---|
| WINDING STRENGTH W | $W_1$ | $W_2$ | $W_3$ | $W_4$ | $W_5$ | he # ALERT DEVICE

CROSS REFERENCE TO RELATED APPLICATION

This application claims the benefit of priority from Japanese Patent Application No. 2018-241153, filed on Dec. 25, 2018, the entire contents of which are incorporated herein by reference.

TECHNICAL FIELD

The present disclosure relates to an alert device.

BACKGROUND

In the related art, a dozing driving warning device is known, which gives intermittently changing restraint force to a driver by intermittently changing the fastening force of a seat belt using a belt fastening force variable device when a driver's doze is detected (For example, Japanese Unexamined Utility Model Publication No. H06-71338).

SUMMARY

When alerting a driver by winding a seat belt with a retractor using a contact load between the seat belt and the driver sitting on a driver's seat, if a driver's sitting posture (driver position) changes, the contact load changes.

In this technical field, it is desirable to alert a driver with an appropriate contact load according to a driver's sitting posture.

An aspect of the present disclosure provides an alert device that alerts a driver sitting on a driver's seat in a vehicle by winding a seat belt on the driver's seat with a retractor, the device includes a seat position information acquisition unit configured to acquire seat position information relating to a position of the driver's seat, a height estimation unit configured to calculate an estimated height that is an estimated value of the driver's height based on the seat position information, a winding strength setting unit configured to set a winding strength that is a strength for winding the seat belt with the retractor based on the estimated height, and a retractor control unit configured to operate the retractor to wind the seat belt with the winding strength.

According to the alert device in an aspect of the present disclosure, the winding strength is set by the winding strength setting unit based on the estimated height calculated by the height estimation unit based on the seat position information. Therefore, for example, it is possible to prevent the contact load from changing due to the change in driver's sitting posture compared to a case of setting the winding strength without considering the driver's height. As a result thereof, it is possible to alert the driver with an appropriate contact load according to the driver's sitting posture.

In an embodiment, the alert device may further include a steering position information acquisition unit configured to acquire steering position information relating to a position of a steering wheel of the vehicle, and the height estimation unit may be configured to calculate the estimated height further based on the steering position information. In this case, the winding strength can be set more appropriately according to the position of the steering wheel.

In an embodiment, the winding strength setting unit may be configured to set the winding strength further based on the seat position information, and may be configured to set the winding strength as a smaller value in a case where the estimated height is equal to or taller than a first threshold value compared to a case where the estimated height is shorter than the first threshold value if the position of the driver's seat is within a predetermined same range of position. Since the driver's physique is more likely to be big as the height increases, for example, if the longitudinal seat position is a constant position, and when the seat belt is wound with a constant winding strength, the contact load is likely to increase as the driver's height increases. Therefore, it is possible to more appropriately set the winding strength according to the tendency of the contact load by considering both the longitudinal seat position information and the estimated height.

Another aspect of the present disclosure provides an alert device that alerts a driver sitting on a driver's seat in a vehicle by winding a seat belt on the driver's seat with a retractor, the device includes a camera configured to image the driver sitting on the driver's seat, a height estimation unit configured to calculate an estimated height that is an estimated value of the driver's height based on an image captured by the camera, a winding strength setting unit configured to set a winding strength that is a strength for winding the seat belt with the retractor based on the estimated height, and a retractor control unit configured to operate the retractor to wind the seat belt with the winding strength.

According to the alert device in another aspect of the present disclosure, the winding strength is set by the winding strength setting unit based on the estimated height calculated by the height estimation unit based on the image captured by the camera. Therefore, for example, it is possible to prevent the contact load from changing due to the change in driver's sitting posture compared to a case of setting the winding strength without considering the driver's height. As a result thereof, it is possible to alert the driver with an appropriate contact load according to the driver's sitting posture.

According to the present disclosure, it is possible to alert the driver with an appropriate contact load according to the driver's sitting posture.

BRIEF DESCRIPTION OF THE DRAWINGS

FIG. 3 is a diagram illustrating an example of setting a winding strength in the alert device in FIG. 1.

FIG. 7 is a diagram illustrating an example of setting the winding strength in the alert device in FIG. 6.

DETAILED DESCRIPTION

Hereinafter exemplary embodiments will be described with reference to the drawings.

First Embodiment

Figure 1:
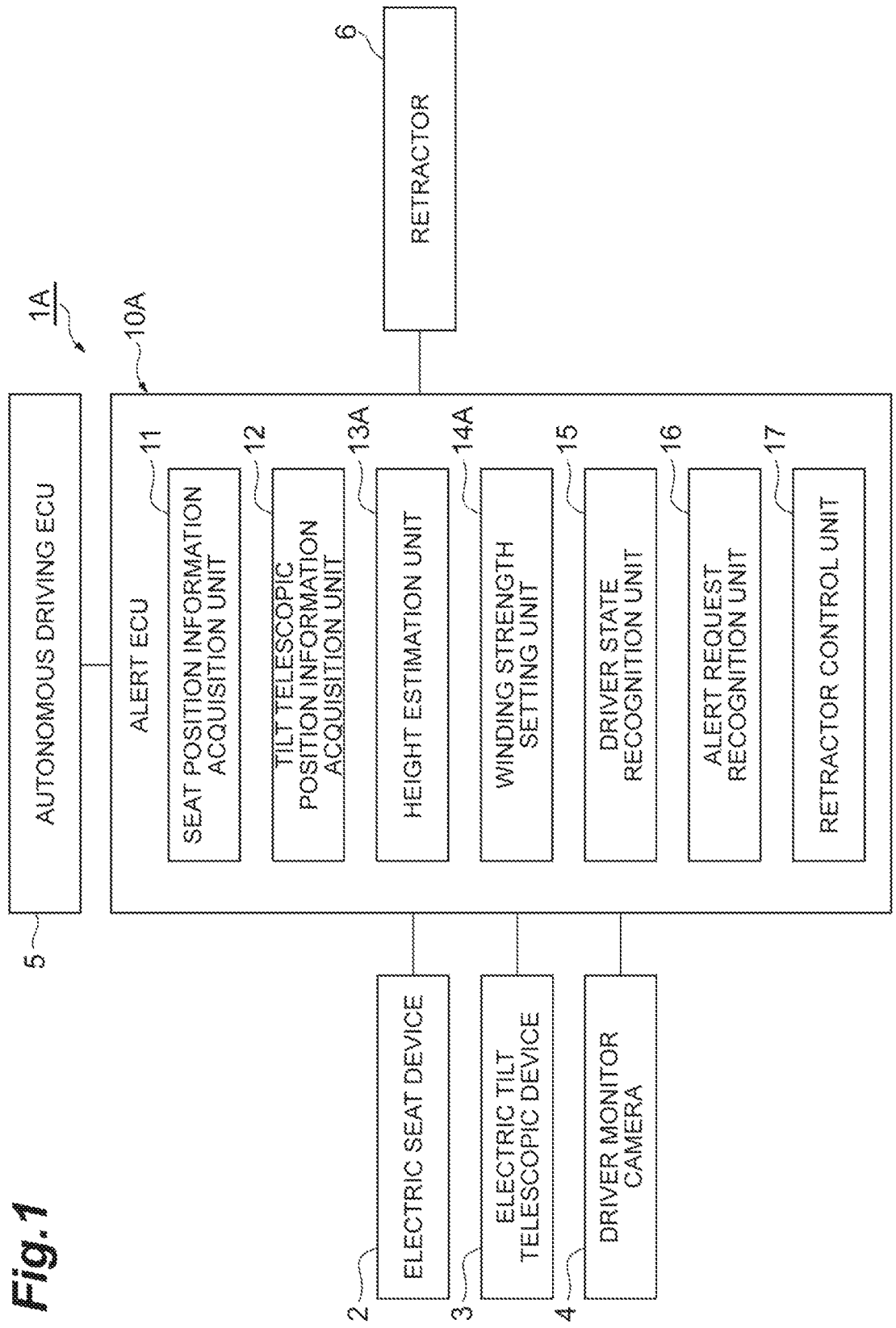
FIG. 1 is a block diagram illustrating an alert device according to a first embodiment.

FIG. 1 is a block diagram illustrating an alert device 1A according to a first embodiment. As an example, the alert device 1A illustrated in FIG. 1 is mounted on a vehicle such as a passenger car capable of autonomous driving, and is a device that alerts a driver sitting on a driver's seat by winding a seat belt on a driver's seat of the vehicle with a retractor. The autonomous driving is a vehicle control that drives the vehicle to a destination without being operated by the driver.

The alert device 1A includes an alerting electronic control unit (ECU) 10A that performs an overall control for the device. The alert ECU 10A is an electronic control unit including a central processing unit (CPU), read only memory (ROM), random access memory (RAM), and the like. The alert ECU 10A realizes each function relating to alerting processing by, for example, loading the program stored in the ROM into the RAM, and executing the program loaded in the RAM by the CPU. The alert ECU 10A may be configured with a plurality of ECUs. A part of the functions of the alert ECU 10A may be performed by a server that can communicate with the vehicle. The alert ECU 10A may be configured as a part of a seat belt device of the vehicle.

An electric seat device 2, an electric tilt telescopic device 3, a driver monitor camera 4, an autonomous driving ECU 5, and a retractor 6 are connected to the alert ECU 10A.

The electric seat device 2 is a device that can adjust the position of the seat (driver's seat) electrically. The electric seat device 2 is provided in the vehicle as at least a driver's seat. The electric seat device 2 adjusts the position of the driver's seat by a known method by driving an electric motor or the like according to, for example, a driver's switch operation or a driver's getting on and off action.

The position of the driver's seat includes the seat position in the longitudinal direction of the vehicle (longitudinal seat position). The electric seat device 2 can adjust the longitudinal seat position within a range in which the driver can be restrained by the seat belt. The electric seat device 2 transmits a detection signal relating to the longitudinal seat position detected by a position sensor to the alert ECU 10A. The position of the driver's seat may include a position of the seat surface in the vertical direction of the vehicle (seat surface height position). In this case, the electric seat device 2 may transmit a detection signal relating to the seat surface height position detected by the built-in position sensor to the alert ECU 10A.

The electric tilt telescopic device 3 is a device that can electrically adjust a position of a steering wheel of the vehicle. The electric tilt telescopic device 3 is provided on a steering column that rotatably supports the steering wheel and a steering shaft. The electric tilt telescopic device 3 adjusts the position of the steering wheel of the vehicle by a known method by driving the electric motor or the like according to, for example, the driver's switch operation or the driver's getting on and off action.

The position of the steering wheel means a predetermined position of the steering wheel that can be changed by at least one of a tilt function and a telescopic function of the electric tilt telescopic device 3 (for example, center position of the steering wheel). The electric tilt telescopic device 3 can adjust the center position of the steering wheel using at least one of a tilt position and a telescopic position. The tilt position means a degree of inclination of the shaft direction of the steering column. A change of the tilt position corresponds to a change of the center position of the steering wheel in the vertical direction of the vehicle caused by the degree of inclination. The telescopic position means the center position of the steering wheel in the shaft direction of the steering column. A change of the telescopic position corresponds to the change of the center position of the steering wheel along the shaft direction of the steering column. The electric tilt telescopic device 3 transmits a detection signal relating to at least one of the tilt position and the telescopic position detected by the built-in position sensor to the alert ECU 10A.

The driver monitor camera 4 is an imaging device that images the driver sitting on the driver's seat. The driver monitor camera 4 is provided at a position in front of the driver on a cover of the steering column of the vehicle, and images at least the driver's face. A plurality of driver monitor cameras 4 may be provided in order to image the driver from a plurality of directions. The driver monitor camera 4 transmits imaging information on the driver to the alert ECU 10A.

The autonomous driving ECU 5 is an electronic control unit for performing the automatic driving of the vehicle. The autonomous driving ECU 5 is an electronic control unit including a CPU, ROM, RAM, and the like. The autonomous driving ECU 5 realizes each function of the autonomous driving by, for example, loading the program stored in the ROM into the RAM, and executing the program loaded in the RAM by the CPU. The autonomous driving ECU 5 may be configured with a plurality of ECUs. A part of the functions of the autonomous driving ECU 5 may be performed by a server that can communicate with the vehicle.

The autonomous driving ECU 5 generates a travel plan along a target route to a destination set in advance based on information on the position of the vehicle detected by a global positioning system (GPS) receiver mounted on the vehicle, map information in the map database, surrounding environments of the vehicle (position of another vehicle or the like) recognized from a result of measurement performed by an external camera and a radar sensor (millimeter wave radar and LIDAR) mounted on the vehicle, and vehicle states (vehicle speed, yaw rate, and the like) recognized from the result measurement performed by internal sensors (vehicle speed sensor, yaw rate sensor, and the like) mounted in the vehicle. The destination may be set by the occupants. The target route may be set by a known navigation system based on the destination. In this case, the navigation system may be integrated with the autonomous driving ECU 5.

The autonomous driving ECU 5 performs the autonomous driving toward the destination according to the travel plan. The autonomous driving ECU 5 performs the autonomous driving by transmitting a control signal to an actuator (engine actuator, steering actuator, brake actuator, and the like) of the vehicle.

The retractor 6 is an actuator that winds and unwinds the seat belt of the vehicle. The retractor 6 is provided for at least the seat belt of the driver's seat of the vehicle. The retractor 6 winds the seat belt in response to a control signal from the alert ECU 10A. The retractor 6 changes a tension of the seat belt by winding the seat belt at a winding strength according to the control signal from the alert ECU 10A. In this way, the stimulus applied to the driver can be changed using the contact load between the driver and the seat belt. The winding strength is a strength to wind the seat belt using the retractor.

Next, a functional configuration of the alert ECU 10A will be described. The alert ECU 10A includes a seat position information acquisition unit 11, a tilt telescopic position information acquisition unit (a steering position information acquisition unit) 12, a height estimation unit 13A, a winding strength setting unit 14A, a driver state recognition unit 15, an alert request recognition unit 16, and a retractor control unit 17.

The seat position information acquisition unit 11 acquires seat position information relating to the position of the driver's seat. The seat position information acquisition unit 11 acquires the longitudinal seat position as the seat position information based on the detection signal relating to the longitudinal seat position from the electric seat device 2. The seat position information acquisition unit 11 may acquire the seat surface height position as the seat position information based on the detection signal relating to the seat surface height position from the electric seat device 2.

The tilt telescopic position information acquisition unit 12 acquires steering position information relating to the position of the steering wheel of the vehicle. The tilt telescopic position information acquisition unit 12 acquires the center position of the steering wheel as the steering position information (details will be described later) based on the detection signal relating to at least one of the tilt position and the telescopic position from the electric tilt telescopic device 3.

The height estimation unit 13A calculates an estimated height based on at least the seat position information. The estimated height is an estimated value of a driver's height. The estimated height in the present disclosure is used as an index for simulating an influence of driver's physique and the driver's sitting posture (driver position) to the contact load between the driver and the seat belt. The estimated height may correspond to an overall body length of the driver (so-called the height).

Figure 2:
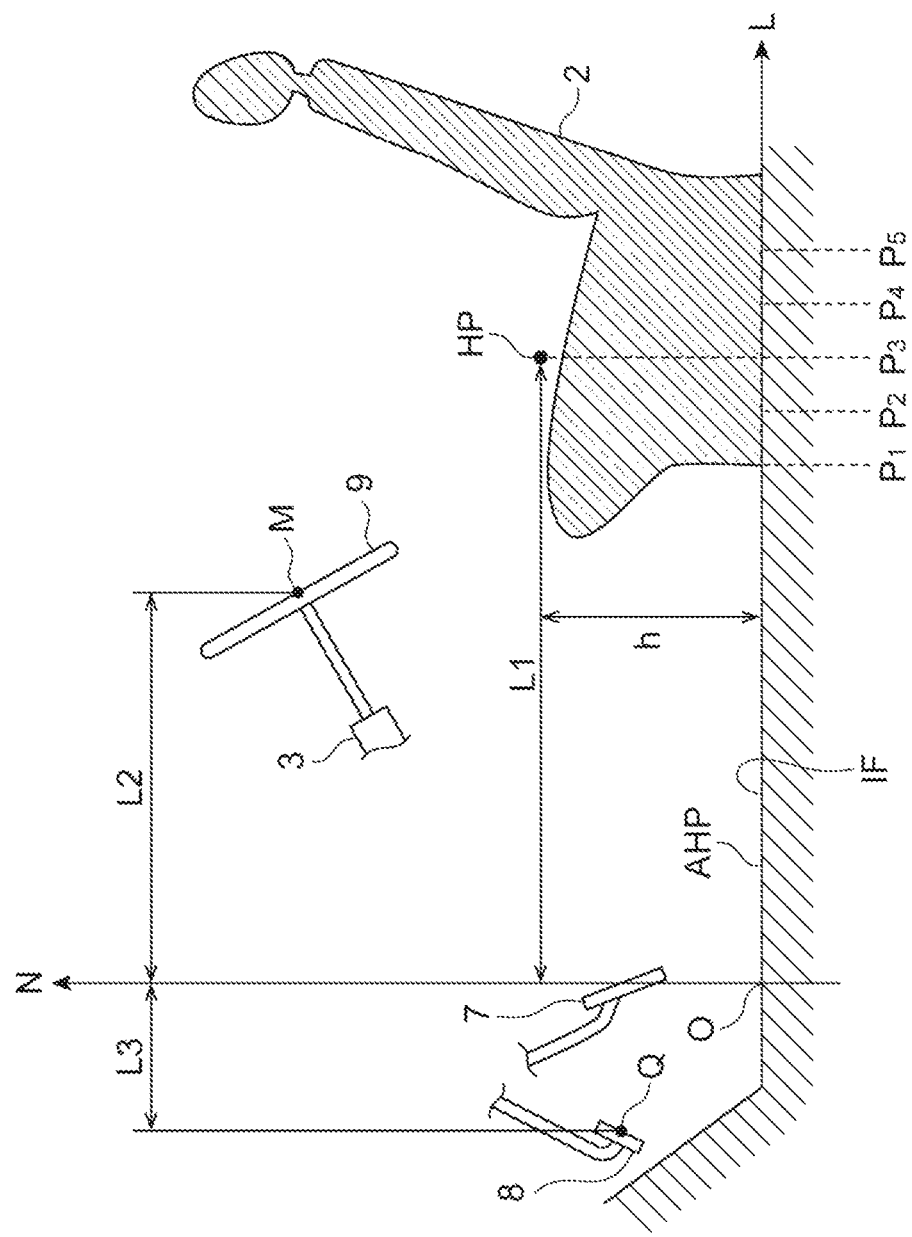
FIG. 2 is a schematic diagram for explaining calculation of an estimated height.

The height estimation unit 13A calculates the estimated height ST based on the seat position information and the steering position information. As a specific example, calculation of the estimated height will be described with reference to FIG. 2. FIG. 2 is a schematic diagram for explaining the calculation of the estimated height. FIG. 2 schematically illustrates a driver's seat represented as a partial sectional view in a side view. In FIG. 2, "AHP" means an accelerator pedal heel point. The accelerator pedal heel point AHP corresponds to, for example, a point where a heel of a right foot of the driver sitting on the driver's seat touches the floor in a passenger compartment. The position of the accelerator pedal heel point AHP is set in advance according to, for example, the interior design of the vehicle. In addition, as illustrated in FIG. 2, a virtual floor surface IF is set in advance as a virtual plane that includes the accelerator pedal heel point including AHP and having the vertical direction N of the vehicle as a normal line, based on accelerator pedal heel point AHP position.

"O" means a standard point, which is a standard position of the right foot of the driver sitting on the driver's seat in the longitudinal direction L of the vehicle. The position of the standard point O in the longitudinal direction L of the vehicle is set in advance according to, for example, the interior design of the vehicle. The position of the standard point O on the floor surface IF in the longitudinal direction L of the vehicle can be a point corresponding to a predetermined position (for example, a center of the pedal surface) of the pedal 7 in a state of being not depressed by the driver.

"Q" means a reference point for defining the driver position at which the driver can properly perform a pedal operation, which is a position of when the driver sitting on the driver's seat is operating the pedal in the longitudinal direction L of the vehicle with at least one of the right foot and the left foot of the driver. The position of the reference point Q in the longitudinal direction L of the vehicle is set in advance according to, for example, the interior design of the vehicle. The position of the reference point Q on the floor surface IF in the longitudinal direction L of the vehicle can be a point corresponding to a point corresponding to a predetermined position (for example, the center of the pedal surface) of the pedal 8 in a state of being depressed by the driver at a predetermined operation amount. The pedal 7 may be an accelerator pedal or may be a brake pedal. The pedal 8 may be a brake pedal or may be a clutch pedal.

"HP" means a hip point (sitting position of driver). The hip point HP can be a predetermined position of a femur of the driver sitting on the driver's seat (for example, a midpoint of the femur in the longitudinal direction of the vehicle).

The position of the hip point HP in the longitudinal direction L of the vehicle changes according to the longitudinal seat position P of the electric seal device 2. In the example in FIG. 2, as the longitudinal seat position P, positions P1, P2, P3, P4, and P5 that are separated from each other at substantially equal intervals in the longitudinal direction L of the vehicle are illustrated. In FIG. 2, as an example, the longitudinal seat position P is the position P3. The longitudinal seat position P is not limited to this example. The longitudinal seat position P may be changed stepwise at any interval or may be changed continuously. The position of the hip point HP in the vertical direction N of the vehicle may be changed according to the seat surface height position of the electric seat device 2.

"M" means a center position of the steering wheel 9. The center position M changes according to at least one of the tilt position and the telescopic position of the electric tilt telescopic device 3. The tilt telescopic position information acquisition unit 12 can calculate the center position M by a known method based on at least one of the tilt position and the telescopic position.

"L1" is a distance from the standard point O to the hip point HP in the longitudinal direction L of the vehicle. The height estimation unit 13A calculates the distance L1 based on the position of the standard point O and the position of the hip point HP. The height estimation unit 13A calculates the distance L1 as the distance between the position of the standard point O and the longitudinal seat position P in the longitudinal direction L of the vehicle based on, for example, the detection signal from electric seat device 2.

"L2" is a distance from the standard point O to the center position M in the longitudinal direction L of the vehicle. The height estimation unit 13A calculates the distance L2 based on the position of the standard point O and the center position M. The height estimation unit 13A calculates the distance L2 as the distance between the position of the standard point O and the center position M, wherein the center position M is calculated according to at least one of the tilt position and the telescopic position in the longitudinal direction L of the vehicle based on, for example, the detection signal from the electric tilt telescopic device 3.

"L3" is a distance from the standard point O to the reference point Q in the longitudinal direction L of the vehicle. The height estimation unit 13A calculates the distance L3 based on the position of the standard point O and the position of the reference point Q. The height estimation unit 13A calculates the distance L3 as the distance between the position of the standard point O and the position of the reference point Q in the longitudinal direction L of the vehicle.

Here, "h" is a height from the floor surface IF to the hip point HP in the vertical direction N of the vehicle. For example, the height estimation unit 13A calculates the height h as a distance between the position of the accelerator pedal heel point AHP and position of the hip point HP in the vertical direction N of the vehicle. If the seat surface height position of electric seat device 2 is adjustable, the height estimation unit 13A may calculate the height h based on the detection signal from the electric seat device 2.

The height estimation unit 13A calculates the estimated height ST using the fact that each parameter described above in the example in FIG. 2 has a relationship in following Equation (1). In Equation (1), K1, K2, K3, K4, K5, and K6 are constants set in advance according to the interior design of the vehicle. The height estimation unit 13A calculates the estimated height ST by getting a solution for ST in Equation (1).

$$L1 = K1 \times h + K2 \times h/ST + K3 \times ST + K4 \times L3/ST + K5 \times L2 + K6 \quad (1)$$

Therefore, the height estimation unit 13A calculates the estimated height ST based on at least the longitudinal seat position P. The height estimation unit 13A calculates the estimated height ST as the steering position information further based on at least one of the tilt position and the telescopic position.

The winding strength setting unit 14A sets the winding strength according to the change in sitting posture based on at least the estimated height. The winding strength setting unit 14A sets the winding strength based on, for example, the estimated height and the seat position information. In the present disclosure, the change in sitting posture is a change in sitting posture of the driver at the driver's seat that may cause a change in contact load between the seat belt and the driver.

The change in sitting posture includes an aspect in which, if the longitudinal seat position P is constant and multiple driver's heights (actual heights) are not constant, the contact load of the seat belt on the driver's shoulder changes under the same winding strength condition. In this aspect, for example, since the driver's physique is more likely to be big as the height (actual height) increases, the seat belt contact load increases under the same wind strength conditions.

Therefore, if the longitudinal seat position P (position of the driver's seat) is within a predetermined same range of position and if the estimated height ST is equal to or taller than a first threshold value, the winding strength setting unit 14A sets the winding strength as a smaller value compared to the case where the estimated height ST is short than the first threshold value. The first threshold value is a value of the estimated height ST used as a boundary for defining the relationship of the magnitude of the winding strength when setting the winding strength on condition that the longitudinal seat position P is within the same range of position. The first threshold value may have one value of estimated height ST value or a plurality of values of estimated height ST. The same range of position is a range of the longitudinal seat position P in which the longitudinal seat position P can be considered to be substantially constant. The same range of position can be set in advance, for example, as a range of the longitudinal seat position P such that the contact load of the seat belt on the driver's shoulder does not substantially change under the same winding strength condition when the driver's height is constant.

The change in sitting posture includes an aspect in which, if the driver's height is constant and the longitudinal seat position P changes, the contact load of the seat belt on the driver's shoulder changes under the same winding strength condition. In this aspect, for example, since the driver's shoulder moves forward as the longitudinal seat position P moves forward, the seat belt contact load increases under the same wind strength conditions.

Therefore, if the estimated height ST is within the same range of height, and if the longitudinal seat position P is ahead of the standard longitudinal position, the winding strength setting unit 14A sets the winding strength as a smaller value compared to the case where the longitudinal seat position P is behind the standard longitudinal position. The standard longitudinal position is a position in the longitudinal direction L of the vehicle used as a boundary for defining the relationship of the magnitude of the winding strength when setting the winding strength on condition that the estimated height ST is within the same range of height. The standard longitudinal position may include one position in the longitudinal direction L of the vehicle or a plurality of positions in the longitudinal directions L of the vehicle. The same range of height is a range of the estimated height ST in which the estimated height ST can be considered to be substantially constant. The same range of height can be set in advance, for example, as a range of the estimated height ST such that the contact load of the seat belt on the driver's shoulder does not substantially change under the same winding strength condition when the longitudinal seat position P is constant.

The change in sitting posture includes an aspect in which the contact load of the seat belt on the driver's shoulder changes under the same winding strength condition when the position of the driver's seat changes due to the fact that the heights (actual heights) of a plurality of drivers (and an actual lengths of the leg) are not constant. In this aspect, for example, the length of leg decreases as the height decreases, and thus, the position of the driver's seat is likely to move forward, therefore, the seat belt contact load increases under the same wind strength conditions.

Therefore, the winding strength setting unit 14A may set a second winding strength as a smaller value compared to a first winding strength. The first winding strength is a winding strength when the estimated height ST is a first height and the longitudinal seat position P is a first seat position. The second winding strength is a winding strength when the estimated height ST is a second height shorter than the first height and the longitudinal seat position P is a second seat position ahead of the first seat position. The first seat position is a longitudinal seat position at which a driver whose estimated height ST corresponds to the first height can appropriately perform the operation of each pedal described above. The second seat position is a longitudinal seat position at which the driver whose estimated height ST corresponds to the second height can appropriately perform the operation of each pedal described above. Whether or not the driver can properly operate each pedal described above may be defined, for example, by a bending degree of a foot when a foot heel of the driver sitting on the electric seat device 2 is positioned at the accelerator pedal heel point AHP. For example, if an angle between the femur and the lower leg across the knee is within a range of angle set in advance, it can be assumed that the driver can appropriately operate each pedal described above. This range of angle may be constant regardless of the longitudinal seat position P.

As an example, the winding strength setting unit 14A sets the winding strength using FIG. 3 in which the winding strength W is defined according to the estimated height ST and the longitudinal seat position P. FIG. 3 is a diagram illustrating a setting example of the winding strength in the alert device 1A. FIG. 3 illustrates a map of winding strength W in which one axis represents the longitudinal seat position P and the other axis represents the estimated height ST. In the axis of the longitudinal seat position P, map points P1, P2, P3, P4, and P5 are provided in an order from the front to the rear. In the axis of the estimated height ST, map points of ST1, ST2, ST3, ST4, and ST5 are provided in an order of increasing estimated height ST. The map in FIG. 3 may be stored in the alert ECU 10A in advance.

As illustrated in FIG. 3, for example, when the longitudinal seat position P is constant at P1, the winding strength W is set so as to decrease in an order of W11, W12, W13, W14, and W15 as the estimated height ST increases. Similarly, when the longitudinal seat position P is constant at P2, the winding strength W is set so as to decrease in an order of W21, W22, W23, W24, and W25 as the estimated height ST increases. When the longitudinal seat position P is constant at P3, the winding strength W is set so as to decrease in an order of W31, W32, W33, W34, and W35 as the estimated height ST increases. When the longitudinal seat position P is constant at P4, the winding strength W is set so as to decrease in an order of W41 W42, W43, W44, and W45 as the estimated height ST increases. When the longitudinal seat position P is constant at P5, the winding strength W is set so as to decrease in an order of W51, W52, W53, W54, and W55 as the estimated height ST increases.

In addition, for example, when the estimated height ST is constant at ST1, the winding strength W is set so as to decrease in an order of W51, W41, W31, W21, and W11 as the longitudinal seat position P moves forward. Similarly, when the estimated height ST is constant at ST2, the winding strength W is set so as to decrease in an order of W52, W42, W32, W22, and W12 as the longitudinal seat position P moves forward. When the estimated height ST is constant at ST3, the winding strength W is set so as to decrease in an order of W53, W43, W33, W23, and W13 as the longitudinal seat position P moves forward. When the estimated height ST is constant at ST4, the winding strength W is set so as to decrease in an order of W54, W44, W34, W24, and W14 as the longitudinal seat position P moves forward. When the estimated height ST is constant at ST5, the winding strength W is set so as to decrease in an order of W55, W45, W35, W25, and W15 as the longitudinal seat position P moves forward.

For example, the driver state recognition unit 15 acquires the driver's face orientation by a known image processing method based on imaging information by the driver monitor camera 4, and then, acquires angle information on the driver's face orientation is acquired for each of the yaw angle direction and the pitch angle direction. The driver state recognition unit 15 recognizes the presence or absence of the driver's inattentiveness by a known method based on the information on the driver's face orientation. The inattentiveness means, for example, a state in which the driver is facing outside of a predetermined range such as a front range. For example, if the driver face orientation is shifted in the yaw angle direction or the pitch angle direction by equal to or more than a predetermined angle with respect to the front direction of the driver over a time set in advance, the driver state recognition unit 15 recognizes the driver's inattentiveness state as the driver state.

The driver state recognition unit 15 recognizes the driver's wakefulness degree based on a driver's closed eye rate per minute, a state of eye opening, a frequency of blinking, or an eye movement by a known image processing method based on, for example, the image information from the driver monitor camera 4. The wakefulness degree is a degree that indicates that the driver is awake rather than in a haze due to the lack of sleep. For example, if the wakefulness degree is equal to or lower than a predetermined threshold value, the driver state recognition unit 15 recognizes a driver's reduced wakefulness degree as the driver state.

The driver state recognition unit 15 acquires a direction of the driver's line of sight by a known image processing method based on, for example, the imaging information from the driver monitor camera 4, and recognizes the presence or absence of the driver's careless driving. The careless driving refers to a state in which, for example, the driver has something to think about, and means that the driver neglects to check the surroundings even though the driver has no significant sleepiness. For example, if the wakefulness degree is not equal to or lower than the predetermined threshold value, and when the change in the direction of the driver's line of sight remains within a predetermined range over a time set in advance, the driver state recognition unit 15 recognizes the driver's careless driving as the driver state.

The alert request recognition unit 16 recognizes the presence or absence of an alert request to the driver based on the driver state recognized by the driver state recognition unit 15. For example, if the driver's inattentiveness state is recognized by the driver state recognition unit 15, the alert request recognition unit 16 recognizes that the alert request to the driver is present. For example, if the driver's reduced wakefulness degree is recognized by the driver state recognition unit 15, the alert request recognition unit 16 recognizes that the alert request to the driver is present. For example, if the driver state recognition unit 15 recognizes the driver careless driving, the alert request recognition unit 16 recognizes that the alert request to the driver is present.

If it is recognized by the alert request recognition unit 16 that the alert request to the driver is present, the retractor control unit 17 operates the retractor 6 so as to wind the seat belt with the winding strength set by the winding strength setting unit 14A. In this way, the retractor control unit 17 gives the driver a stimulus for making the driver aware of driving the vehicle, for example. If it is recognized by the alert request recognition unit 16 that the alert request to the driver is not present, the retractor control unit 17 may operate the retractor 6 so as to feed out the seat belt that has been wound up.

[Example of Arithmetic Processing by Alert ECU 10A]

Figure 4:
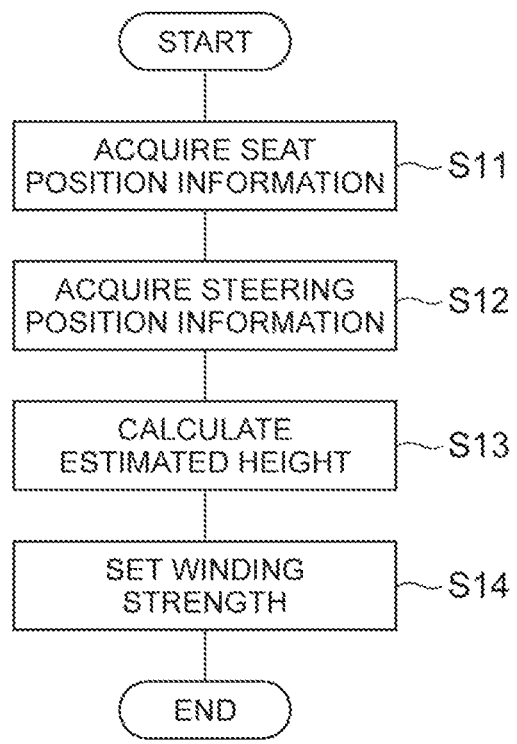
FIG. 4 is a flowchart illustrating winding strength setting processing in the alert device in FIG. 1.

Subsequently, an example of arithmetic processing by the alert ECU 10A will be described. FIG. 4 is a flowchart illustrating winding strength setting processing in the alert device 1A. The flowchart in FIG. 4 is executed, for example, while the vehicle is driving by the autonomous driving.

As illustrated in FIG. 4, in STEP S11 the alert ECU 10A acquires the seat position information using the seat position information acquisition unit 11. The seat position information acquisition unit 11 acquires the longitudinal seat position P as the seat position information based on, for example, the detection signal for the longitudinal seat position P from the electric seat device 2. The seat position information acquisition unit 11 acquires the seat surface height position as the seat position information based on, for example the detection signal relating to the seat surface height position from the electric seat device 2.

In STEP S12 the alert ECU 10A acquires the steering position information using the tilt telescopic position information acquisition unit 12. The tilt telescopic position information acquisition unit 12 acquires, for example, the center position of the steering wheel as the steering position information based on the detection signal from the electric tilt telescopic device 3 relating to the tilt position and the telescopic position.

In STEP S13, the alert ECU 10A calculates the estimated height ST using the height estimation unit 13A. The height estimation unit 13A calculates the estimated height ST, for example, by getting a solution for ST in above Equation (1) based on the seat position information and the steering position information.

In STEP S14, the alert ECU 10A sets the winding strength using the winding strength setting unit 14A. The winding strength setting unit 14A sets the winding strength W, for example, using the map in FIG. 3 based on the estimated height ST and the longitudinal seat position P. Thereafter, the alert ECU 10A ends the current winding strength setting processing, and performs the winding strength setting processing again from STEP S11.

Figure 5:
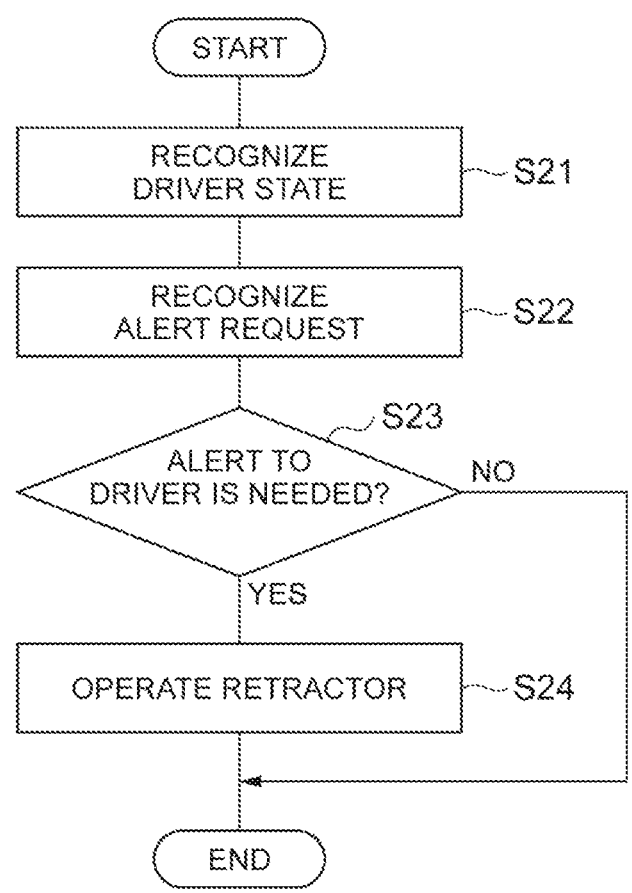
FIG. 5 is a flowchart illustrating alerting processing.

FIG. 5 is a flowchart illustrating alerting processing. The flowchart in FIG. 5 is executed during driving by autonomous driving of the vehicle, for example, together with the winding strength setting processing of FIG. 4.

As illustrated in FIG. 5, in STEP S21, the alert ECU 10A recognizes the driver state using the driver state recognition unit 15. The driver state recognition unit 15 recognizes the driver state by a known method based on, for example, the imaging information on the driver received from the driver monitor camera 4.

In STEP S22, the alert ECU 10A recognizes the alert request using the alert request recognition unit 16. The alert request recognition unit 16 recognizes the presence or absence of the alert request to the driver based on, for example, the driver state recognized by the driver state recognition unit 15. In STEP S23, the alert ECU 10A determines whether the alert to the driver is needed or not using the retractor control unit 17. For example, if it is recognized by the alert request recognition unit 16 that the alert request to the driver is present, the retractor control unit 17 determines that the alert to the driver is needed. For example, if it is recognized by the alert request recognition unit 16 that the alert request to the driver is not present, the retractor control unit 17 determines that the alert to the driver is not needed.

If it is determined by the retractor control unit 17 that the alert to the driver is needed (YES in S23), the alert ECU 10A operates the retractor using the retractor control unit 17 in STEP S24. The retractor control unit 17 operates the retractor 6 so as to wind the seat belt with the winding strength W set by the winding strength setting unit 14A, for example. Thereafter, the alert ECU 10A ends the alerting processing and performs the alerting processing again from STEP S21.

If it is determined by the retractor control unit 17 that the alert to the driver is not needed (NO in S23), the alert ECU 10A does not perform the above-described retractor winding operation using retractor control unit 17. The retractor control unit 17 may extend the seat belt that has been wound up. Thereafter, the alert ECU 10A ends the alerting processing and performs the alerting processing again from STEP S21.

[Operational Effects of Alert device 1A]

As described above, according to alert device 1A, the winding strength W is set by the winding strength setting unit 14A based on the estimated height ST calculated by the height estimation unit 13A based on the seat position information. Therefore, for example, it is possible to prevent the contact load from changing due to the change in driver's sitting posture compared to a case of setting the winding strength without considering the driver's height. As a result thereof, it is possible to alert the driver with an appropriate contact load according to the driver's sitting posture.

The alert device 1A includes the tilt telescopic position information acquisition unit 12 that acquires at least one of the tilt position and the telescopic position, as the steering position information relating to the position of the steering wheel of the vehicle. The height estimation unit 13A calculates the estimated height ST based on at least one of the tilt position and the telescopic position. In this case, the winding strength can be set more appropriately according to the position of the steering wheel.

In alert device 1A, the winding strength setting unit 14A sets the winding strength W based on the estimated height ST and the longitudinal seat position P. If the longitudinal seat position P is within the same range of position and if the estimated height ST is equal to or taller than the first threshold value, the winding strength setting unit 14A sets the winding strength W as a smaller value compared to a case where the estimated height ST is shorter than the first threshold value. Since the driver's physique is more likely to be big as the height increases, for example, if the longitudinal seat position P is a constant position, and when the seat belt is wound with a constant winding strength, the contact load is likely to increase as the driver's height increases. Therefore, it is possible to more appropriately set the winding strength W according to the tendency of the contact load by considering both the longitudinal seat position P and the estimated height ST.

Compared to a case where the seat belt is wound with a constant winding strength, if a certain winding strength W which is smaller than the constant winding strength is set by the winding strength setting unit 14A, the burden on the retractor 6 can be reduced.

Second Embodiment

Figure 6:
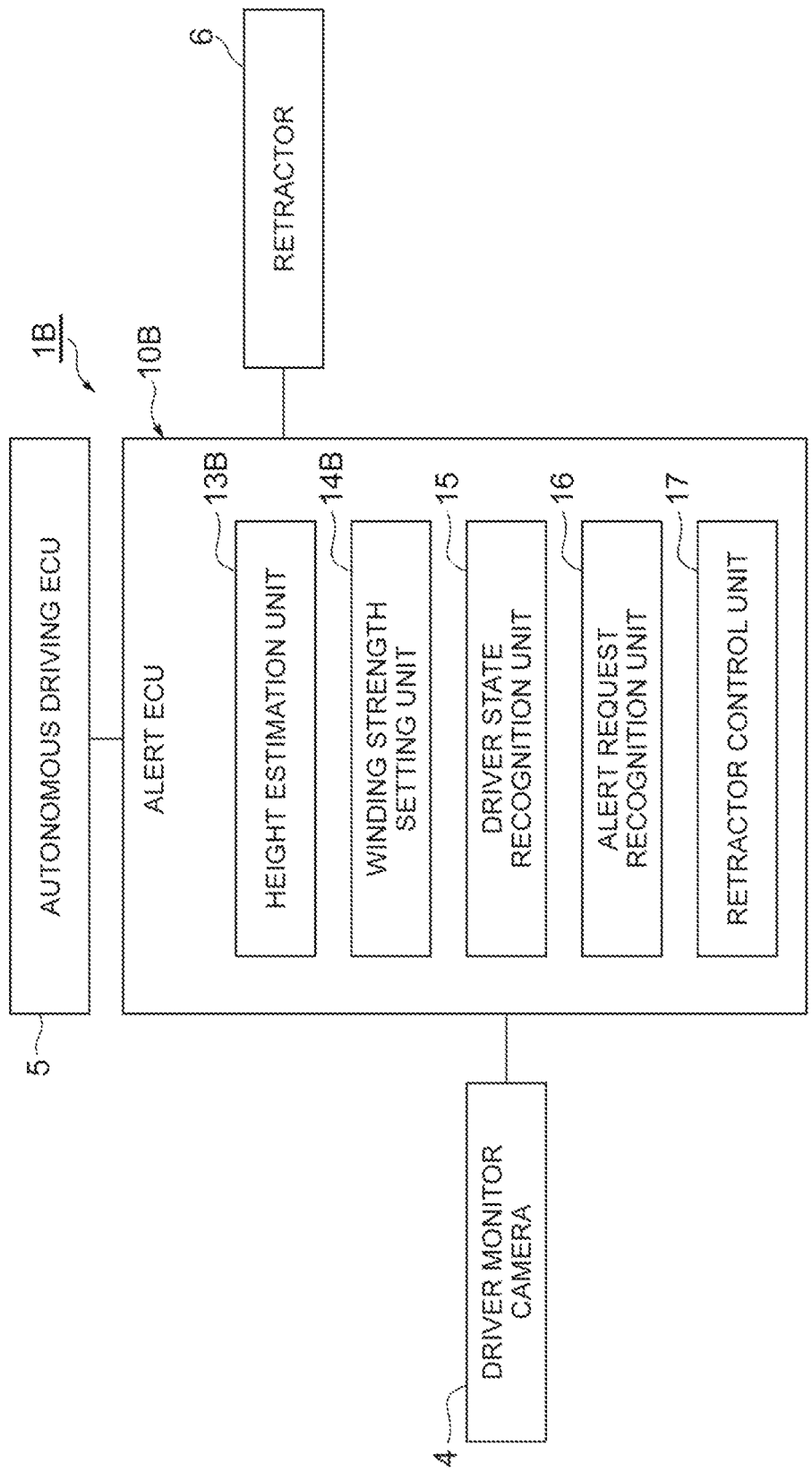
FIG. 6 is a block diagram illustrating an alert device according to a second embodiment.

FIG. 6 is a block diagram illustrating, an alert device 1B according to a second embodiment. As illustrated in FIG. 6, the alert device 1B is differ from the alert device 1A in a point that the alert device 1B includes an alert ECU 10B instead of the alert ECU 10A and the electric seat device 2 and electric tilt telescopic device 3 are not connected to the alert ECU 10B. In other respects, the alert device 1B is configured in the same way as the alert device 1A.

The alert ECU 10B does not include the seat position information acquisition unit 11 and the tilt telescopic position information acquisition unit 12 of the alert ECU 10A. The alert ECU 10B includes a height estimation unit 13B and a winding strength setting unit 14B as functional configurations different from the height estimation unit 13A and the winding strength setting unit 14A of the alert ECU 10A. For other functional configurations, the alert ECU 10B is configured in the same way as the alert ECU 10A.

The height estimation unit 13B calculates the estimated height ST based on the image captured by the driver monitor camera (camera) 4. The image captured by the driver monitor camera 4 is an image in which the passenger compartment including driver is imaged.

Specifically, the height estimation unit 13B calculates a 3-Dimensional distance from the driver monitor camera 4 to the driver by, for example, performing the image processing on the image captured by the driver monitor camera 4 using a known method. The height estimation unit 13B estimates a body length (so-called a sitting height) that is focused on the vertical direction of the vehicle when the driver is sitting on the driver's seat, using the calculated 3-dimensional distance. The height estimation unit 13B estimates a body length (so-called a length of the leg) that is focused on the longitudinal direction of the vehicle when the driver is sitting on the driver's seat based on the estimated sitting height. The height estimation unit 13B calculates the estimated height ST by, for example, obtaining the sum of the sitting height and the length of the leg based on the estimated sitting height and the length of the leg.

Here, the height estimation unit 13B may estimate the length of the leg from the sitting height based on a correlation between the sitting height and the length of the leg stored in advance. The correlation between the sitting height and the length of the leg means, for example, a relationship that gives an average length of the legs corresponding to a certain sitting height. The correlation between the sitting height and the length of the leg can be set in advance based on the sitting height and the length of the leg data collected at equal to or more than a certain number of samples.

The winding strength setting unit 14B sets the winding strength according to the change in sitting posture based on the estimated height ST.

As described above, the change in sitting posture includes an aspect in which, if the position of the driver's seat changes due to the fact that the driver's height (and length of the leg) are not constant, the contact load of the seat belt on the driver's shoulder changes under the same winding strength condition. In this aspect, for example, since the position of the driver's seat is more likely to move forward as the height increases, the contact load of the seat belt increases under the same wind strength condition.

Therefore, the winding strength setting unit 14B sets the winding strength not based on, for example, the direct position of the driver's seat by the position sensor or the like of the electric seat device but based on the estimated height ST. For example, in a map or function that does not take the position of the driver's seat as an argument, if the estimated height ST is shorter than a second threshold value, the winding strength setting unit 14B sets the winding strength W as a smaller value compared to a case where the estimated height ST is equal to or taller than the second threshold value. The second threshold value is a value of the estimated height ST that is a boundary for defining the relationship of the magnitude of the winding strength W when setting the winding strength W without being based on the direct position of the driver's seat. The second threshold value may have one value of estimated height ST or a plurality of values of estimated height ST.

As an example, the winding strength setting unit 14B sets the winding strength W using a map of winding strength W that takes only the estimated height ST as an argument. FIG. 7 is a diagram illustrating a setting example of the winding strength in the alert device 1B. FIG. 7 illustrates a map of winding strength W in which an axis represents the estimated height ST. In the axis of the estimated height ST, map points of ST1, ST2, ST3, ST4, and ST5 are provided in an order of increasing estimated height ST. The map in FIG. 7 may be stored in the alert ECU 10B in advance.

As illustrated in FIG. 7, for example, the winding strength W is set so as to decrease in an order of W5, W4, W3, W2, and W1 as the estimated height ST decreases. The relationship of magnitude of the winding strength W is based on a fact that the position of the driver's seat is likely to move forward as the estimated height ST decreases in order for the driver to appropriately operate the each pedal described above.

[Example of Arithmetic Processing by Alert ECU 10B]

Subsequently, an example of arithmetic processing by the alert ECU 10B will be described. In the arithmetic processing by the alert ECU 10B, the winding strength setting processing is partly different from that in the above-described arithmetic processing by the alert ECU 10A in FIG. 4, and the alerting processing is similar to that in the above-described arithmetic processing by the alert ECU 10A in FIG. 5. Therefore, the description of the alerting processing will not be repeated, and the winding strength setting processing will be described with reference to FIG. 8.

Figure 8:
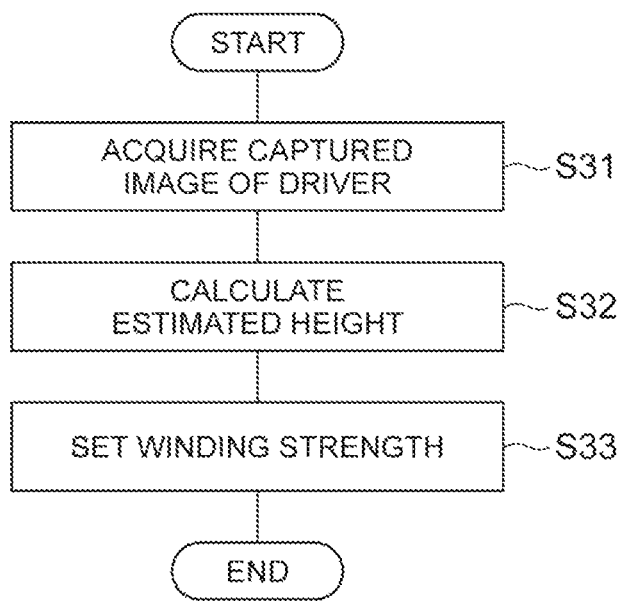
FIG. 8 is a flowchart illustrating the winding strength setting processing in the alert device of FIG. 6.

As illustrated in FIG. 8, in STEP S31, the alert ECU 10B acquires the captured image of the driver using the height estimation unit 13B. For example, the height estimation unit 13B acquires the captured image of the driver based on the imaging information from the driver monitor camera 4.

In STEP S32, the alert ECU 10B calculates the estimated height ST using the height estimation unit 13B. The height estimation unit 13B calculates the estimated height ST by, for example, calculating the sum of the sitting height and the length of the leg based on the sitting height and the length of the leg estimated based on the captured image of the driver.

In STEP S33, the alert ECU 10B sets the winding strength using the winding strength setting unit 14B. For example, the winding strength setting unit 14B sets the winding strength W using the map in FIG. 7 not based on the direct position of the driver's seat but based on the estimated height ST. Thereafter, the alert ECU 10B ends the wind strength setting processing and performs the wind strength setting processing again from STEP S31.

[Operational Effects of Alert device 1B]

As described above, according to alert device 1B, the winding strength W is set by the winding strength setting unit 14B based on the estimated height ST calculated by the height estimation unit 13B based on the image captured by the driver monitor camera 4. Therefore, for example, it is possible to prevent the contact load from changing due to the change in driver's sitting posture compared to a case of setting the winding strength without considering the driver's height. As a result thereof, it is possible to alert the driver with an appropriate contact load according to the driver's sitting posture.

In the alert device 1B, the winding strength setting unit 14B sets the winding strength W not based on the direct position of the driver's seat but based on estimated height ST. For example, in a map or function that does not take the position of the driver's seat as an argument, if the estimated height ST is shorter than the second threshold value, the winding strength setting unit 14B sets the winding strength W as a smaller value compared to a case where the estimated height ST is equal to or taller than the second threshold value. Since the length of the leg is more likely to decrease as the height increases, for example, the position of the driver's seat is more likely to move forward as the height increases. Therefore, when the seat belt is wound with a certain winding strength, the position of the driver's seat moves forward as the driver's height decreases, the contact load may be excessively increased. Therefore, when it is not directly based on the position of the driver's seat, it is possible to more appropriately set the winding strength according to the tendency of the contact load by considering the movement of the position of the driver's seat with the change of the estimated height.

MODIFICATION EXAMPLE

As described above, the embodiments of the present disclosure are described, however, the present disclosure is not limited to the embodiments described above. The present disclosure can be embodied in various forms including various modifications and improvements based on the knowledge of those skilled in the art, including the embodiments described above.

For example, in the first embodiment described above, the height estimation unit 13A calculated the estimated height ST based on the steering position information, but may calculate the estimated height not based on the steering position information. In this case, the tilt telescopic position information acquisition unit 12 may be omitted.

In the first embodiment described above, if the longitudinal seat position P is within the same range of position and when the estimated height ST is equal to or taller than the first threshold value, the winding strength setting unit 14A sets the winding strength W as a smaller value compared to a case where the estimated height ST is shorter than the first threshold value, but not limited thereto. In addition, if the estimated height ST is within the same range of height and when the longitudinal seat position P is ahead of the standard longitudinal position, the winding strength setting unit 14A sets the winding strength W as a smaller value compared to a case where the longitudinal seat position P is behind the standard longitudinal position, but not limited thereto. The relationship of the magnitude of the winding strength W for the estimated height ST and the relationship of the magnitude of the winding strength W for the longitudinal seat position P can be set in any way. In short, the winding strength setting unit 14A may set the winding strength according to the change in sitting posture based on at least the estimated height.

In the first embodiment described above, the winding strength setting unit 14A may set the winding strength W not based on the longitudinal seat position P. In this case, for example, the winding strength setting unit 14A may set the winding strength W just like the winding strength setting unit 14B in the second embodiment.

In the second embodiment described above, the winding strength setting unit 14B may set the winding strength W further based on the longitudinal seat position P. In this case, for example, the winding strength setting unit 14B may set the winding strength W just like the winding strength setting unit 14A in the first embodiment.

In the first embodiment described above, the height estimation unit 13A may calculate the estimated height ST further using the image captured by the driver monitor camera 4. In the second embodiment described above, the height estimation unit 13B may calculate the estimated height ST further using the steering position information from the tilt telescopic position information acquisition unit 12.

In the first and second embodiments described above, the driver state recognition unit 15 recognizes the driver's inattentiveness state, the driver's reduced wakefulness degree, and the driver's careless driving as examples of the driver state, but the driver state is not limited thereto. The driver state may be any state as long as that state can be used for determining whether or not the alerting is necessary by the alert request recognition unit 16.

What is claimed is:

1. An alert device that alerts a driver sitting on a driver's seat in a vehicle by winding a seat belt on the driver's seat with a retractor, the device comprising:
   a seat position information acquisition unit configured to acquire seat position information relating to a position of the driver's seat;
   a height estimation unit configured to calculate an estimated height that is an estimated value of the driver's height based on the seat position information;
   a winding strength setting unit configured to set a winding strength that is a strength for winding the seat belt with the retractor based on the estimated height; and
   a retractor control unit configured to operate the retractor to wind the seat belt with the winding strength.

2. The alert device according to claim 1, comprising:
   a steering position information acquisition unit configured to acquire steering position information relating to a position of a steering wheel of the vehicle,
   wherein the height estimation unit is configured to calculate the estimated height further based on the steering position information.

3. The alert device according to claim 1,
   wherein the winding strength setting unit is configured to set the winding strength further based on the seat position information, and
   wherein the winding strength setting unit is configured to set the winding strength as a smaller value in a case where the estimated height is equal to or taller than a first threshold value compared to a case where the estimated height is shorter than the first threshold value if the position of the driver's seat is within a predetermined same range of position.

4. The alert device according to claim 2,
   wherein the winding strength setting unit is configured to set the winding strength further based on the seat position information, and
   wherein the winding strength setting unit is configured to set the winding strength as a smaller value in a case where the estimated height is equal to or taller than a first threshold value compared to a case where the estimated height is shorter than the first threshold value if the position of the driver's seat is within a predetermined same range of position.

5. An alert device that alerts a driver sitting on a driver's seat in a vehicle by winding a seat belt on the driver's seat with a retractor the device comprising:
   a camera configured to image the driver sitting on the driver's seat;
   a height estimation unit configured to calculate an estimated height that is an estimated value of the driver's height based on an image captured by the camera;
   a winding strength setting unit configured to set a winding strength that is a strength for winding the seat belt with the retractor based on the estimated height; and
   a retractor control unit configured to operate the retractor to wind the seat belt with the winding strength.

* * * * *